United States Patent
Bastioli

(10) Patent No.: US 9,273,207 B2
(45) Date of Patent: Mar. 1, 2016

(54) MIXTURES OF BIODEGRADABLE POLYESTERS WITH AT LEAST ONE POLYMER OF NATURAL ORIGIN

(71) Applicant: Novamont S.p.A., Novara (IT)

(72) Inventor: Catia Bastioli, Novara (IT)

(73) Assignee: Novamont S.p.A., Novara (IT)

( * ) Notice: Subject to any disclaimer, the term of this patent is extended or adjusted under 35 U.S.C. 154(b) by 0 days.

(21) Appl. No.: 14/466,108

(22) Filed: Aug. 22, 2014

(65) Prior Publication Data

US 2014/0364539 A1 Dec. 11, 2014

Related U.S. Application Data

(60) filed as application No. PCT/EP2010/066784 on Nov. 4, 2010, now Pat. No. 8,846,825.

(60) Provisional application No. 13/574,791.

(30) Foreign Application Priority Data

Nov. 5, 2009 (IT) .......................... MI2009A001938

(51) Int. Cl.
*C08L 67/02* (2006.01)
*C08L 3/02* (2006.01)
*C08L 67/04* (2006.01)

(52) U.S. Cl.
CPC . *C08L 67/02* (2013.01); *C08L 3/02* (2013.01); *C08L 67/04* (2013.01); *C08L 2201/06* (2013.01)

(58) Field of Classification Search
CPC ...... C08G 63/08; C08G 63/181; C08L 67/02; C08L 67/03; C08L 67/04; C08L 3/02; C08L 2201/06
USPC .................. 525/437, 444, 448; 528/272, 302
See application file for complete search history.

(56) References Cited

U.S. PATENT DOCUMENTS

| | | |
|---|---|---|
| 2005/0107572 A1 | 5/2005 | Bastioli et al. |
| 2008/0214702 A1 | 9/2008 | Bastioli et al. |
| 2008/0281018 A1* | 11/2008 | Seeliger et al. ............... 523/124 |
| 2011/0178211 A1 | 7/2011 | Kawahara et al. |
| 2012/0232191 A1 | 9/2012 | Auffermann et al. |

FOREIGN PATENT DOCUMENTS

| | | |
|---|---|---|
| DE | 102005053068 A1 | 5/2007 |
| WO | WO-2006/097353 A1 | 9/2006 |
| WO | WO-2010/034710 A1 | 4/2010 |

* cited by examiner

*Primary Examiner* — Robert Jones, Jr.
(74) *Attorney, Agent, or Firm* — Novak Druce Connolly Bove + Quigg LLP

(57) ABSTRACT

Provided are mixtures of biodegradable polyesters comprising at least one polymer of natural origin and at least two aliphatic-aromatic polyesters of the diacid-diol type of which at least one with a high content of long chain aliphatic diacids of renewable origin showing excellent mechanical properties, sufficiently high melting temperatures, adequate crystallization rates, improved biodegradability properties as well as stability of physical properties over time.

27 Claims, No Drawings

MIXTURES OF BIODEGRADABLE POLYESTERS WITH AT LEAST ONE POLYMER OF NATURAL ORIGIN

RELATED APPLICATIONS

This application is a Divisional of co-pending U.S. application Ser. No. 13/574,791 filed on Jul. 24, 2012, which is a National Phase filing of PCT/EP2010/066784 filed on Nov. 4, 2010; and this application claims priority to Application No. MI2009A001938 filed in Italy on Nov. 5, 2009. The entire contents of each application is hereby incorporated by reference.

DESCRIPTION

The present invention relates to mixtures comprising at least one polymer of natural origin and at least two biodegradable aliphatic-aromatic polyesters of the diacid-diol type of which at least one with a high content of long chain aliphatic diacids of renewable origin.

Biodegradable aliphatic-aromatic polyesters obtained starting from aliphatic diacids such as adipic acid, aromatic diacids such as terephthalic acid and aliphatic diols are known in the literature and to the market.

A limit of these polymers is constituted by the fact that the monomers of which they are composed mainly come from non-renewable sources. This causes them to have a significant environmental impact regardless of their biodegradability.

Furthermore, currently marketed polyesters of this kind have quantities of aromatic acid of less than 48% by moles, since above this threshold even the percentage of biodegradation of these polyesters decreases significantly. This markedly limits the possibility of using said polyesters for applications where high mechanical properties associated to compostability are needed, such as for example for the production of bags for collecting organic waste.

Composting is the industrial process that imitates the processes, reproducing them in a controlled and accelerated form, which in nature bring back the organic substances to the life cycle. In nature the organic substance produced and no longer "useful" for life (dry leaves, branches, animal remains etc.) is decomposed by the microorganisms present in the soil which return it to the natural cycle. The less degradable components remaining constitute the humus which therefore represents an important food supply for plants given its capacity to release the nutritive elements (nitrogen, phosphorous, potassium etc.) slowly but constantly, ensuring constant fertility of the ground. Industrial composting is therefore a process in which structures are provided for rational management of the microbiological activities that occur spontaneously in nature with the aim of reducing the time necessary to obtain a type of humus, i.e. the compost, and improve the quality of the end product with respect to the product obtained naturally.

Similarly, home composting is a process in which the organic matter of food scraps from kitchen and garden is accumulated in compost bins, or holes dug in the ground, and degraded aerobically under conditions milder than those of industrial composting. Particularly, the aerobic biodegradation in home composting processes occurs at room temperature, typically between 10 and 45° C.

As regards the aliphatic aromatic polyesters of the type mentioned above, the presence of aromatic monomers such as terephthalic acid in the chain is relevant to obtain aliphatic-aromatic polyesters with sufficiently high melting temperatures, adequate crystallization rates, relevant mechanical properties, such as ultimate strength, puncture energy and modulus of elasticity, and excellent industrial processability characteristics. The synthetic origin of monomers nonetheless limits the possibility for these polyesters to significantly reduce the consumption of resources (feedstock) from non-renewable carbon, regardless of their biodegradability.

On the other hand, a high content of aliphatic monomers of synthetic origin such as adipic acid, while being desirable for achieving a suitable level of biodegradability, not only increases the environmental impact of these polyesters but also worsens the mechanical properties thereof. Moreover, a high content of aliphatic monomers significantly lowers the melting temperature of the polyester and decreases its crystallization rate at high temperature, thus requiring the use of more frigories and longer cooling times during industrial processing of the polyester. These limits have a negative influence on the industrial processability of these polyesters.

Biodegradable compositions of natural polymers with polyesters are also known in the market. Because of their mechanical and biodegradability properties, said compositions are particularly suitable to be used for producing films for food packaging and bags, particularly for collecting organic waste.

Still, it is known that these compositions undergo to a deterioration in physical properties and particularly of mechanical and rheological properties under the influence of one or more environmental factors, such as heat, light or chemicals.

The problem underlying the present invention is therefore to find a biodegradable material capable of combining improved biodegradability properties, excellent mechanical properties, a high level of industrial processability, limited environmental impact as well as stability of physical properties under the influence of environmental factors.

Starting from this problem, it has now surprisingly been found that, by mixing specific quantities of a first biodegradable aliphatic-aromatic polyester obtained starting from adipic acid, aromatic diacids and from diols, a second aliphatic-aromatic polyester with a high content of long chain aliphatic diacids from renewable source and at least one polymer of natural origin, there is a range of compositions that allows a material with excellent mechanical properties, sufficiently high melting temperatures, adequate crystallization rates, biodegradability in composting as well as stability of physical properties over time to be obtained.

In particular, the present invention relates to a mixture comprising:
(A) at least a first aliphatic-aromatic biodegradable polyester (A) of the diacid-diol type obtainable by a mixture comprising:
  a) at least one acid component having the following composition:
    a1) 51-95% by moles of aliphatic dicarboxylic acids, composed for at least 50%, preferably 60% and more preferably 70% by moles of long chain diacids of renewable origin;
    a2) 5-49% by moles of polyfunctional aromatic acids;
  b) at least one diol;
(B) at least a second biodegradable aliphatic-aromatic polyester (B) obtainable starting from a mixture comprising adipic acid, terephthalic acid and at least one aliphatic diol;
(C) at least one polymer of natural origin (C);
wherein the concentration of (A) varies, with respect to (A+B) in the range between 5 and 95%, preferably between 20 and 70% and more preferably between 30 and 60% in weight, wherein (C) is present in a quantity lower than 50%, preferably lower than 45%, more preferably lower than 40% by weight with respect to (A+B+C), said mixture having a Melt Flow Index (MFI) of 1.5-10 g/10 min, preferably of 2-7 g/10 min.

With regards to the MFI, it is measured at 160° C. and 5 kg according to the standard ASTM 1238-89 "Standard Test Method for Melt Flow Rates of Thermoplastics by Extrusion Plastometer".

Advantageously, the mixture according to the present invention shows a high stability of physical properties, particularly in relation to their Melt Flow Index (MFI).

In the meaning of the present invention "high stability" of MFI means that, after 6 months in normal storing conditions (i.e. 23° C. 55% RH), the MFI of the mixture is lower than 12 g/10 min, preferably lower than 10 g/10 min, more preferably lower than 7 g/10 min.

In the meaning of the present invention, products obtained from sources which, due to their intrinsic characteristic, are naturally regenerated or are not exhaustible in the time scale of human life and, by extension, whose use does not compromise natural resources for future generations, are considered as being of renewable origin. The use of products of renewable origin also contributes to decreasing $CO_2$ in the atmosphere and decreasing the use of non-renewable resources. A typical example of renewable sources is constituted by vegetable crops.

Long chain diacids in the present invention are intended as dicarboxylic acids with more than 6 carbon atoms in the main chain. Said long chain diacid are preferably selected from the group consisting of aliphatic dicarboxylic acids with number of C atoms in the main chain comprised between 7 and 22, esters and mixtures thereof, suberic acid, azelaic acid, sebacic acid, dodecanedioic acid, brassylic acid, octadecandioic acid, their esters and mixtures thereof being particularly preferred.

In the polyester (A) polyfunctional aromatic acids are intended as dicarboxylic aromatic compounds of the phthalic acid type and dicarboxylic heterocyclic aromatic compounds of renewable origin, mixtures and esters thereof. Particularly preferred are terephthalic acid and its esters and 2,5-furandicarboxylic acid and its esters, and mixtures thereof.

The content of polyfunctional aromatic diacids in the polyester (A) is comprised between 5 and 49%, preferably between 30 and 48.5%, and more preferably between 40 and 48% by moles with respect to the total content by moles of dicarboxylic acids.

Examples of diols in the polyester (A) are 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexanedimethanol, propylene glycol, neo-pentylglycol, 2-methyl-1,3-propanediol, dianhydro-sorbitol, dianhydro-mannitol, dianhydro-iditol, cyclohexanediol, cyclohexanemethanediol, and mixtures thereof. Among these, 1,4 butandiol, 1,3 propandiol, 1,2 ethandiol and mixtures thereof are particularly preferred. Advantageously, said diols are constituted by at least 50%, preferably at least 80% in moles by 1,4 butandiol with respect to the total diol content.

The polyester (A) can contain, in addition to the basic monomers, at least one hydroxy acid in a quantity comprised between 0-49%, preferably between 0-30% by moles with respect to the moles of the aliphatic dicarboxylic acid. Examples of suitable hydroxy acids are glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactid acid. The hydroxy acids can be inserted in the chain as is or can also be made to react firstly with diacids or diols. Said hydroxyacids can be present with either a random or a block repeating units distribution.

Long bifunctional molecules also with function not in the terminal position can also be added in quantities not exceeding 10%. Examples are dimer acids, ricinoleic acid, and acids with epoxide functions.

Amines, amino acids and amino alcohols can also be present in percentages up to 30% by moles with respect to all the other components.

In the preparation process of the polyester (A), one or more polyfunctional molecules can advantageously be added, in quantities comprised between 0.01 and 3% by moles with respect to the quantity of dicarboxylic acids (and any hydroxy acids), in order to obtain branched products. Examples of these molecules are glycerol, pentathritol, trimethylolpropane, citric acid, dipentaerythritol, monoanhydrosorbitol, monohydro-mannitol, acid triglycerides, undecylenic acid, triethanolamine, 1,1,2-etantricarboxylic acid; 1,1,2,2-etantetracarboxylic acid, 1,3,5 pentatricarboxylic acid, 1,2,3,4-cyclopentatetracarboxylic acid, malic aci, tartaric acid, 3-hydroxyglutaric acid, mucic acid, trihydroxyglutaric acid, hydroxy-isophthalic acid, esantriol, sorbitol, trimethiletane, mannitol, 1,2,4 butantriol, xilitol, 1,2,4,4-tetrakis(hydroxymethyl)cyclohexane, arabitol, adonitol, iditol.

The molecular weight $M_n$ of the polyester (A) is greater than 15,000, preferably greater than 30,000, more preferably greater than 40,000. The polydispersity index $M_w/M_n$ is comprised between 1.5 and 10, preferably between 1.6 and 5 and more preferably between 1.7 and 3.

The molecular weights Mn and Mw can be measured using Gel Permeation Chromatography (GPC). Determination can be conducted with the chromatography system maintained at 40° C., using a set of three columns in series (particle diameter of 5µ and porosity respectively of 500 Å, 1000 Å and 10000 Å), a refraction index detector, chloroform as eluent (flow rate 1 ml/min) and using polystyrene as standard of reference.

The polyester (A) has an inherent viscosity (measured with Ubbelhode viscometer for solutions in $CHCl_3$ with concentration 0.2 g/dl at 25° C.) greater than 0.5 dl/g, preferably greater than 0.6 dl/g and even more preferably greater than 0.7 dl/g.

The process of production of the polyester (A) may take place according to any of the known processes in the state of the art. In particular the polyester may be advantageously obtained through a polycondensation reaction.

Advantageously the process of polymerisation of the polyester may be performed in the presence of a suitable catalyst. Among such suitable catalysts mention may be made by way of example of organometallic compounds of tin, for example those deriving from stannoic acid, compounds of titanium, for example orthobutyltitanate, compounds of aluminium, for example Al-triisopropyl, and compounds of antimony and zinc.

Preferably, the biodegradable polyester (A) is obtainable by reacting at least one precursor polyester PP having at least one acid component of the type mentioned above and at least one diol component of the type mentioned above with compounds carrying groups which can react with OH and/or COOH groups, such as for example, polyepoxides and polycarbodiimides or with radical initiators.

Said compounds can be used also in mixture.

Said at least one precursor polyester PP may be of the aliphatic, aromatic or aliphatic-aromatic type.

The skilled person will easily be able to identify the actual molar ratios necessary with respect to the nature of the precursor polyesters PP so as to obtain the desired polyester (A).

Preferably, the polyester (A) is obtainable by a reactive extrusion process.

Among radical initiators, preferred are peroxides and among peroxides particularly preferred are organic peroxides. Organic peroxides can advantageously selected from the group consisting of: benzoyl peroxide, lauroyl peroxide, isononanoyl peroxide, di-(t-butylperoxyisopropyl)benzene, t-butyl peroxide, dicumyl peroxide, alpha,alpha'-di(t-butylperoxy)diisopropylbenzene, 2,5-dimethyl-2,5 di(t-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxydicarbonate, dicetyl peroxydicarbonate, dimyristyl peroxydicarbonate, 3,6,9-triethyl-3,6,9-trimethyl-1,4,7-triperoxonan, di(2-ethylhexyl) peroxydicarbonate and mixtures thereof.

Preferably, said peroxides are added to the at least one precursor polyester PP in a quantity of less than 0.1%, more preferably of 0.05% and even more preferably of 0.02% by weight.

Examples of polyepoxides that can advantageously be used are all polyepoxides from epoxidized oils and/or from styrene-glycidyl ether-methylmetacrylate, such as products distributed by BASF Resins B.V. under the trademark Joncryl® ADR, glycidyl ether methylmetacrylate included in a range of molecular weights between 1000 and 10000 and with a number of epoxies per molecule ranging from 1 to 30 and preferably from 5 to 25, and epoxies selected from the group comprising: diethylene glycol diglycidyl ether, polyethylene glycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxide, 1,4-cyclohexanedimethanol diglycidyl ether, glycidyl 2-methylphenyl ether, glycerol propoxylate triglycidyl ether, 1,4-butanediol diglycidyl ether, sorbitol polyglycidyl ether, glycerol diglycidyl ether, tetraglycidyl ether of meta-xylenediamine and diglycidyl ether of bisphenol A, and mixtures thereof.

Preferably, said polyepoxides are added to the at least one precursor polyester PP in a quantity of less than 2%, more preferably of 1% and even more preferably of 0.75% by weight.

Catalysts can also be used to increase the reactivity of the reactive groups. In the case of polyepoxides, salts of fatty acids can, for example, be used. Calcium and zinc stearates are particularly preferred.

Examples of carbodiimides that can advantageously be used are selected from the group comprising: poly(cyclooctylene carbodiimide), poly(1,4-dimethylene cyclohexylene carbodiimide), poly(cyclohexylene carbodiimide, poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6', tetra-isopropyl-diphenylene carbodiimide), (Stabaxol® D), poly(2,4,6-triisopropyl-1,3-phenylene carbodiimide) (Stabaxol® P-100), poly(1,3,5-triisopropyl-phenylene-2,4-carbodiimide), poly(2,6 diisopropyl-1,3-phenylene carbodiimide) (Stabaxol® P), poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis(ethylcarbodiimide) and mixtures thereof.

Preferably, said carbodiimides are added to the at least one precursor polyester PP in a quantity of less than 1.5%, more preferably of 0.75% and even more preferably of 0.5% by weight.

Said at least one precursor polyester PP may preferably have an unsaturation content of 0.1-0.8 and more preferably of 0.2-0.7% in moles.

Said unsaturations can be generated in situ during the polymerization phase or during processing of the at least one precursor polyester PP, through the addition of suitable unsaturated monomers or suitable unsaturated chain terminators, Particularly preferred are precursor polyesters PP with terminal unsaturations.

Among unsaturated chain terminators, preferred are those having formula:

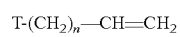

wherein "T" is a group able to react with carboxylic and/or hydroxylic groups and "n" is an integer number comprised between 0 and 13.

Said unsaturated chain terminators can also be used in mixture.

With regard to "T", it is preferably selected from the group consisting of hydroxylic, carboxylic, amine, amide or ester group, hydroxylic or carboxylic groups being particularly preferred.

The integer "n" is preferably comprised between 1 and 13, more preferably 3 and 13, still more preferably 8 or 9, omega-undecenoic acid, omega-undecylenic alcohol and mixtures thereof being particularly preferred in order to maximize compatibility with the at least one polymer of natural origin.

Also after the preparation process, the biodegradable polyester (A) can have double bonds and/or adducts deriving from the reaction of the unsaturations with the radical initiators.

The presence of the unsaturations and/or adducts deriving from their reaction with the radical initiators can be determined with different methods well known to those skilled in the art, such as NMR spectroscopy or by methanolysis reactions of the polymer chain coupled with chromatographic methods combined with mass spectrometry.

The skilled person will easily be able to identify structures referable either to the unsaturations or to the reacted unsaturation after the reaction.

Preferably, the biodegradable polyester (A) is obtainable through a reactive extrusion process starting from a precursor polyester PP having a content of terminal acid groups in quantities of 35-150 meq of KOH/kg of the precursor polyester.

The measurement of terminal acid groups can be carried out as follows: 1.5-3 g of the polyester according to the invention are placed into a 100 ml Erlenmeyer flask. 60 ml of chloroform are added to dissolve the resin. After complete dissolution 25 ml of 2-propanol and, just before the determination, 1 ml of deionised water are added. The solution thus obtained is titrated with a preliminary standardized KOH/ethanol solution using a suitable indicator for the determination of the equivalence point of the titration, such as for example a glass electrode designed for use with nonaqueous acid-base titrations. The terminal acid group content is calculated from the consumption of the KOH/ethanol solution based on the following equation:

$$\text{Terminal acid group content(meq KOH/kg of polymer)} = \frac{\lfloor(V_{eq} - V_b) \cdot T\rfloor \cdot 1000}{P}$$

wherein: $V_{eq}$=ml of KOH/ethanol solution at the equivalence point for the titration of the sample;
$V_b$=ml of KOH/ethanol solution necessary to arrive at pH=9.5 during the blank titration;
T=concentration in moles/1 of the KOH/ethanol solution;
P=g of sample.

Among the biodegradable aliphatic-aromatic polyesters (B), polyesters with melting point comprised between 50 and 170° C., preferably comprised between 55 and 130° C. and more preferably between 60 and 110° C. are preferred.

With regard to the acid component of the biodegradable aliphatic-aromatic polyesters (B), it preferably comprises from 5-65% by moles, preferably 15-60%, still more preferably 46-55% of terephthalic acid or derivatives thereof.

Sulfonate compounds can be comprised between 0 and 5% by moles, considering the sum of the percentages of the different components of 100%. Said sulfonate compounds are preferably selected from the group consisting of alkali metal or alkaline earth metal salt of a dicarboxylic acid containing sulfonate groups, or the ester-forming derivatives thereof, more preferably alkali metal salts of 5-sulfoisophthalic acid or mixtures thereof, particularly preferably the sodium salt.

The presence of isocyanates or corresponding compounds is also possible, containing two, three or four functional groups capable of reacting with terminal groups of the aliphatic-aromatic polyesters, or mixtures of isocyanates and corresponding compounds. Among these, tolylene 2,4-diisocyanate, tolylene 2,6-diisocyanate, 4,4' and 2,4-diphenylmethane diisocyanate, naphthylene 1,5-diisocyanate, xylylene diisocyanate, hexamethylene diisocyanate, isophorone diisocyanate and methylenebis (4-isocyanato-cyclohexane) are preferred.

Preferably, said polyesters (B) comprises at least one diol selected from the group consisting of $C_2$-$C_6$ alkanediols and $C_5$-$C_{10}$ cycloalkanediols and mixtures thereof. Among these, 1,4 butanediol, 1,3 propandiol, 1,2 ethandiol and mixtures thereof are particularly preferred. Advantageously, said diols are constituted by at least 50%, preferably at least 80% in moles by 1,4 butanediol with respect to the total diol content.

With regard to the aliphatic-aromatic polyesters (B), the teaching of WO 96/15173 have to be intended as incorporated in the present description. Preferably, in the aliphatic-aromatic polyesters (B) can be present 0.01-5% by moles, based on the total content of repeating units, of a polyfunctional compound.

Said polyfunctional compound is preferably selected in the group consisting of glycerol, pentathritol, trimethylolpropane, citric acid, dipentaerythritol, monoanhydrosorbitol, monohydro-mannitol, acid triglycerides, undecylenic acid, triethanolamine, 1,1,2-etantricarboxylic acid; 1,1,2,2-etantetracarboxylic acid, 1,3,5 pentatricarboxylic acid, 1,2,3,4-cyclopentatetracarboxylic acid, malic aci, tartaric acid, 3-hydroxyglutaric acid, mucic acid, trihydroxyglutaric acid, hydroxy-isophthalic acid, esantriol, sorbitol, trimethiletane, mannitol, 1,2,4 butantriol, xilitol, 1,2,4,4-tetrakis(hydroxymethyl)cyclohexane, arabitol, adonitol, iditol.

The polyester (B) can contain, in addition to the basic monomers, at least one hydroxy acid in a quantity comprised between 0-49%, preferably between 0-30% by moles with respect to the moles of the aliphatic dicarboxylic acid. Examples of suitable hydroxy acids are glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactide. The hydroxy acids can be inserted in the chain as is or can also be made to react firstly with diacids or diols. Said monomers can be present with either a random or a block repeating units distribution.

The at least one polymer of natural origin (C) is advantageously selected from starch, cellulose, chitin, chitosan, alginates, proteins such as gluten, zein, casein, collagen, gelatin, natural rubbers, rosin acid and its derivatives, lignins and their derivatives. Starches and celluloses can be modified and among these it is possible mentioning, for example, starch or cellulose esters with degree of substitution comprised between 0.2 and 2.5, hydroxypropylated starches, modified starches with fatty chains.

Among the polymers of natural origin above mentioned, starch is particularly preferred.

The term starch is intended herein as all types of starch, for example potato starch, corn starch, tapioca starch, pea starch, rice starch, wheat starch and also high-amylose starch—preferably containing more than 30% by weight of amylose—and waxy starches. Particularly preferred are also mixtures of starches.

The starch can be used in destructurized or gelatinized form or in filler form. Said starch can represent the continuous or dispersed phase or can be in co-continuous form.

In general, to obtain co-continuous structures it is possible to work either on the selection of starch with high amylopectine content and/or to add to the starch-polyester compositions block copolymers with hydrophobic and hydrophilic units. Possible examples are polyvinylacetate/polyvinylalcohol and polyester/polyether copolymers in which the block length, the balance between the hydrophilicity and hydrophobicity of the blocks and the quality of compatibilizer used can be suitably changed in order to finely adjust the microstructure of the starch-polyester compositions.

In the case of dispersed starch, the starch represent preferably an homogeneously dispersed phase of particles with mean dimensions of less than 1 µm, preferably less than 0.8 µm.

The dimensions of starch particles are measured in the transverse section with respect to the direction of the extrusion flow or, anyhow, with respect to the direction of material's output.

For this purpose a sample of the mixture which is to be examined is immersed in liquid nitrogen and subsequently fractured so as to obtain a fracture surface along a cross-section of the sample. The portion of the sample which is to be examined is then subjected to selective etching, dried and a thin layer of metal is deposited thereupon, for example a mixture of gold/palladium, using a "sputter coater". Finally the surface of the fracture is examined under a scanning electron microscope (SEM).

The dimension of starch particles is determined by measuring the dimensions of the holes on the surface of the fracture after the selective etching of starch.

The mean dimension of the starch particles, i.e. the holes detectable on the etched surface of the fracture, is calculated as the numeral (or arithmetic) average of the particles dimensions.

In case of a spherical particle the dimension of the particle corresponds to the diameter of a circle corresponding to the bidimensional shape resulting from the transverse section. In case of a non-spherical particle the dimension (d) of the particle is calculated according to the following formula:

$$d = \sqrt{d_1 \cdot d_2}$$

where $d_1$ is the minor diameter and $d_2$ is the major diameter of the ellipse in which the particle can be inscribed or approximated.

The selective etching of starch dispersed phase, may be advantageously performed with HCl 5N as etchant with an etching time of 20 minutes at an etching temperature of 25° C.

Mixtures containing destructurized starch are preferred.

Starches such as corn and potato starch, capable of being easily destructurizable and which have high initial molecular weights, have proven to be particularly advantageous.

The use of corn and potato starch is particularly preferred.

For destructurized starch, the teachings contained in EP-O 118 240 and EP-O 327 505 are referred to here, this being intended as starch processed so that it substantially has no "Maltese crosses" under the optical microscope in polarized light and no "ghosts" under the optical microscope in phase contrast.

Furthermore, physically and chemically modified starch grades can be used, such as ethoxylated starches, oxypropylated starches, starch acetates, starch butyrate, starch propionates, with a substitution degree comprised within the range of from 0.1 to 2, cationic starches, oxidized starches, crosslinked starches, gelled starches.

Mixtures according to the present invention wherein starch represent the dispersed phase can form biodegradable polymeric compositions with good resistance to ageing and to humidity. Indeed, these polymeric compositions can maintain a high tear strength even in condition of low humidity.

Such characteristics can be achieved when the water content of the composition during mixing of the component is preferably kept between 1% and 15% by weight. It is, however, also possible to operate with a content of less than 1% by weight, in this case, starting with predried and pre-plasticized starch.

It could be useful also to degrade starch at a low molecular weight before or during compounding with the polyesters of the present invention in order to have in the final material or finished product a starch inherent viscosity between 1 and 0.2 dl/g, preferably between 0.6 and 0.25 dl/g, more preferably between 0.55 and 0.3 dl/g.

Desctructurized starch can be obtained before or during the mixing with the polyesters according to the present invention in presence of plasticizers such as water, glycerol, di and poly glycerols, ethylene or propylene glycol, ethylene and propylene diglycol, polyethylene glycol, polypropylenglycol, 1,2 propandiol, trymethylol ethane, trymethylol propane, pentaerytritol, dipentaerytritol, sorbitol, erytritol, xylitol, mannitol, sucrose, 1,3 propanediol, 1,2 butanediol, 1,3 butanediol, 1,4 butanediol, 1,5 pentanediol, 1,5 hexanediol, 1,6 hexanediol, 1,2,6 hexanetriol, 1,3,5 hexanetriol, neopentyl glycol and polyvinyl alcohol prepolymers and polymers, polyols acetates, ehtoxylates and propoxylates, particularly sorbitol ethoxylate, sorbitol acetate, and pentaerythritol acetate.

Water can be used as a plasticizer in combination with high boiling point plasticizers or alone during the plastification phase of starch before or during the mixing of the composition and can be removed at the needed level by degassing on one or more steps during extrusion. Upon completion of the plastification and mixing of the components, the water is removed by degassing to give a final content of about 0.2-3% by weight.

Water, as well as high-boiling point plasticizers, modifies the viscosity of the starch phase and affects the rheological properties of the starch/polymer system, helping to determine the dimensions of the dispersed particles. Compatibilizers can be also added to the mixture. They can belong to the following classes:

Additives such as esters which have hydrophilic/lipophilic balance index values (HLB) greater than 8 and which are obtained from polyols and from mono or polycarboxylic acids with dissociation constants pK lower than 4.5 (the value relates to pK of the first carboxyl group in the case of polycarboxylic acids)

Esters with HLB values of between 5.5 and 8, obtained from polyols and from mono or polycarboxylic acids with less than 12 carbon atoms and with pK values greater than 4.5 (this value relates to the pK of the first carboxylic group in the case of polycarboxylic acids)

Esters with HLB values lower than 5.5 obtained from polyols and from fatty acids with 12-22 carbon atoms.

These compatibilizers can be used in quantities of from 0.2 to 40% weight and preferably from 1 to 20% by weight related to the starch. The starch blends can also contain polymeric compatibilizing agents having two components: one compatible or soluble with starch and a second one soluble or compatible with the polyester.

Examples are starch/polyester copolymers through transesterification catalysts. Such polymers can be generated trough reactive blending during compounding or can be produced in a separate process and then added during extrusion. In general block copolymers of an hydrophilic and an hydrophobic units are particularly suitable. Additives such as di and polyepoxides, di and poly isocyanates, isocyanurates, polycarbodiimmides and peroxides can also be added. They can work as stabilizers as well as chain extenders.

All the products above can help to create the needed microstructure.

It is also possible to promote in situ reactions to create bonds between starch and the polymeric matrix. Also aliphatic-aromatic polymers chain extended with aliphatic or aromatic diisocyanates or di and polyepoxides or isocyanurates or with oxazolines with intrinsic viscosities higher than 1 dl/g or in any case aliphatic-aromatic polyesters with a ratio between Mn and MFI at 190° C., 2.16 kg higher than 10 000, preferably higher than 12 500 and more preferably higher than 15 000 can also be used to achieve the needed microstructure.

The mixtures according to the present invention show good properties also in case of starch blends in which the starch is not strongly complexed. With regard to the complexation of the starch, the teachings contained in EP-O 965 615 have to be intended as incorporated in the present description. The presence of the complexes of starch with one hydrophobic polymer incompatible with the starch can be demonstrated by the presence in the X-ray diffraction spectra of a peak in the range of the 13-14° on the 2 theta scale. According to the present invention, with the wording compositions in which the starch is not strongly complexed are intended the compositions where the Hc/Ha ratio between the height of the peak (Hc) in the range of 13-14° of the complex and the height of the peak (Ha) of the amorphous starch which appears at about 20.5° is less than 0.15 and even less than 0.07.

Advantageously, the mixtures according to the present invention contain at least one plasticizer for the starch to provide suitable rheological properties. This plasticizer can simply be water (even the water contained in the native starch alone without the need for further additions), or high boiling or polymeric plasticizers of the type mentioned above. Mixtures of different plasticizers are also preferred.

The quantity of plasticizer is generally chosen on the basis of rheological needs and of the mixing system. In any case, plasticizers are advantageously added in a quantity of less than 30%, preferably less than 20%, still more preferably less than 10% in weight in relation to the starch on a dry basis.

Besides water, plasticizers that can be utilized in the compositions according to the invention are high boiling or polymeric plasticizers.

In the meaning of the present invention, high boiling plasticizers are meant plasticizers with boiling point higher than 250° C. Among these, those described in WO 92/14782, glycerol, diglycerol, triglycerol and tetraglycerol and mixtures thereof are preferred.

Particularly preferred are also mixtures of high boiling plasticizers containing at least 75% in weight, preferably 90% in weight of diglycerol, triglycerol and tetraglycerol. Said mixtures contain more than 50% in weight, preferably more than 80% in weight of diglycerol with respect to the total weight of diglycerol, triglycerol and tetraglycerol. The use of this type of high boiling plasticizers is particularly preferred as they prevent problems with fumes in processing environments and there are no frequent shutdowns made necessary for cleaning the machines during the composition processing.

In the meaning of the present description, with the term diglycerol are herein meant all compounds deriving from condensation reactions of two molecules of glycerol, such as alpha-alpha' diglycerol, alpha-beta diglycerol, beta-beta' diglycerol, their various cyclic isomers and mixtures thereof. As far as diglycerol is concerned, particularly preferred are mixtures comprising at least 70% in weight of alpha-alpha' diglycerol.

Mixtures according to the present invention containing water as the only plasticizer are also preferred. Among these, mixtures containing the water present in native starch as the only plasticizer particularly preferred.

The mixtures according to the invention can be used in blends, which may also be obtained by reactive extrusion processes, with one or more polymers which may or may not be biodegradable.

In particular the mixtures according to the invention may be blended with biodegradable polyesters of the diacid-diol, hydroxyacid or polyester-ether type. Preferably, said biodegradable polyesters are biodegradable polymers according to standard EN 13432.

As far as the said biodegradable polyesters of the diacid-diol type are concerned, these may be either aliphatic or aliphatic-aromatic.

The biodegradable aliphatic polyesters from diacid-diols comprise aliphatic diacids and aliphatic diols, while the biodegradable aliphatic-aromatic polyesters have an aromatic part mainly comprising polyfunctional aromatic acids, the aliphatic part being constituted by aliphatic diacids and aliphatic diols.

The aliphatic aromatic biodegradable polyesters from diacids-diols are preferably characterised by an aromatic acids content of between 30 and 90% in moles, preferably between 45 and 70% in moles with respect to the acid component.

Preferably the polyfunctional aromatic acids may advantageously be dicarboxylic aromatic compounds of the phthalic acid type and their esters, preferably terephthalic acid.

The polyfunctional aromatic acids may also be selected from the group comprising of heterocyclic dicarboxylic aromatic acids, among which 2,5-furandicarboxylic acid and its esters are preferred.

Biodegradable aliphatic-aromatic polyesters from diacids-diols in which the aromatic diacid component comprises a mixture of dicarboxylic aromatic compounds of the phthalic acid type and heterocyclic dicarboxylic aromatic acids are particularly preferred.

The aliphatic diacids of the biodegradable aliphatic-aromatic polyesters are aliphatic dicarboxylic acids such as oxalic acid, malonic acid, succinic acid, glucaric acid, adipic acid, pimelic acid, suberic acid, azelaic acid, sebacic acid, undecandioic acid, dodecanoic acid and brassylic acid, their esters and their mixtures. Among these adipic acid and dicarboxylic acids from renewable sources are preferred, and among these dicarboxylic acids from renewable sources such as succinic acid, sebacic acid, azelaic acid, undecanedioic acid, dodecanedioic acid and brassylic acid and their mixtures are particularly preferred.

Examples of aliphatic diols in biodegradable polyesters from diacids-diols are: 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexanedimethanol, neopentylglycol, 2-methyl-1,3-propanediol, dianhydrosorbitol, dianhydromannitol, dianhydroiditol, cyclohexanediol, cyclohexanemethanediol and their mixtures. Of these, 1,4-butanediol, 1,3-propanediol and 1,2-ethanediol and their mixtures are particularly preferred.

Among biodegradable polyesters of the diacid-diol type, particularly preferred are aliphatic/aromatic copolyesters such as for example polybutylene terephthalate-co-sebacate, polybutylene terephthalate-co-azelate, polybutylene terephthalate-co-brassilate, polybutylene terephthalate-co-adipate, polybutylene terephthalate-co-succinate and polybutylene terephthalate-co-glutarate, and aliphatic polyesters such as for example polyalkylene succinates and particularly polybutylene succinate and its copolymers with adipic acid and lactic acid.

Preferably the blends of the mixtures according to the invention with biodegradable polyesters from diacids-diols described above are characterised by a content of the said biodegradable polyesters from diacids-diols which varies within the range between 1 and 99% by weight, more preferably between 5 and 95% by weight with respect to the sum of the weights of the mixtures according to the invention and the former respectively.

The preferred biodegradable polyesters from hydroxy acids include: poly-L-lactic acid, poly-D-lactic acid and poly-D-L-lactic acid stereocomplex, poly-ϵ-caprolactone, polyhydroxybutyrate, polyhydroxybutyrate valerate, polyhydroxybutyrate propanoate, polyhydroxybutyrate hexanoate, polyhydroxybutyrate decanoate, polyhydroxybutyrate dodecanoate, polyhydroxybutyrate hexadecanoate, polyhydroxybutyrate octadecanoate and poly-3-hydroxybutyrate-4-hydroxybutyrate. Among the biodegradable polyesters from hydroxy acids those particularly preferred are poly-L-lactic acid, poly-D-lactic acid and stereo-complex of poly-L-lactic and poly-D-lactic acid.

Preferably the blends of the mixtures according to the invention with the biodegradable polyesters from hydroxy acids described above are characterised by a content of the said biodegradable polyesters from hydroxy acids which varies within the range between 1 and 99% by weight, more preferably between 5 and 95% by weight with respect to the sum of the weights of the mixtures according to the invention and the former respectively.

The mixtures according to the invention may also be blended with polyolefins, non-biodegradable polyesters, polyester- and polyether-urethanes, polyurethanes, polyamides, polyamino acids, polyethers, polyureas, polycarbonates and mixtures thereof.

Among the polyolefins, polyethylene, polypropylene, their copolymers, polyvinyl alcohol, polyvinyl acetate, polyethylvinyl acetate and polyethylenevinyl alcohol are preferred.

Among the non-biodegradable polyesters, PET, PBT, PTT in particular with a renewables content>30% and polyalkylene furandicarboxylates are preferred. Among the latter polyethylene furandicarboxylate, polypropylene furandicarboxylate, polybutylene furandicarboxylate and their mixtures are preferred.

Examples of polyamides are: polyamide 6 and 6.6, polyamide 9 and 9.9, polyamide 10 and 10.10, polyamide 11 and 11.11, polyamide 12 and 12.12 and their combinations of the 6/9, 6/10, 6/11 and 6/12 type.

The polycarbonates may be polyethylene carbonates, polypropylene carbonates, polybutylene carbonates and their mixtures and copolymers.

The polyethers may be polyethylene glycols, polypropylene glycols, polybutylene glycols, their copolymers and their mixtures having molecular weights between 70,000 and 500,000.

Preferably the blends of the mixtures according to the invention with the polymers described above (polyolefins, non-biodegradable polyesters, polyester- and polyether-urethanes, polyurethanes, polyamides, polyamino acids, polyethers, polyureas, polycarbonates and mixtures thereof) are characterised by a content of the said polymers which varies within the range from 0.5 to 99% by weight, more preferably from 5 to 50% by weight with respect to the sum of the weights of the mixtures according to the invention and the former respectively.

The mixtures according to the invention can advantageously be used in blends with 5-30% by weight, preferably 7-25% by weight of at least one rigid polymer with a modulus greater than 1,500 MPa. Said at least rigid polymer can be present as a further dispersed phase as well in lamellar structures or mixtures thereof.

As far as said further dispersed phase is concerned, said at least rigid polymer forms an homogeneously dispersed phase of particles with mean dimensions of less than 2 μm, preferably less than 1 μm.

The dimensions of said particles are measured according to the method of measurement above disclosed for the starch particles.

Among rigid polymers, particularly preferred are polyhydroxyalkanoates, such as polylactic acid and polyglycolic acid and more preferably polymers or copolymers of polylactic acid containing at least 75% of L-lactic or D-lactic acid or combinations thereof, advantageously with molecular weight Mw greater than 70,000. Said rigid polymers can also be plasticized.

The selective etching of polylactic acid dispersed phase, may be advantageously performed with acetone as etchant with an etching time of 5 minutes at an etching temperature of 25° C.

The blends of the mixture according to the present invention with one or more polymers of the type mentioned above are particularly suitable for the production of films. Advantageously, the films obtained with said blends show excellent mechanical properties as well as high thermal resistance.

Blends of the mixtures according the present invention with PLA are of particular interest because their high compatibility with PLA polymers and copolymers permits to cover materials with a wide range of rigidities—which makes these blends particularly suitable for injection molding and extrusion.

To improve the transparency and toughness of such blends and decrease or avoid a lamellar structure of polylactide polymers, it is possible to introduce other polymers as compatibilizers or toughening agents such as: polybutylene succinate and copolymers with adipic acid and or lactic acid and or hydroxyl caproic acid, polycaprolactone, aliphatic polymers of diols from C2 to C13 and diacids from C4 to C13, polyhydroxyalkanoates, polyvinylalcohol in the range of hydrolysis degree between 75 and 99% and its copolymers, polyvinylacetate in a range of hydrolysis degree between 0 and 70%, preferably between 0 and 60%. Particularly preferred as diols are ethylene glycol, propandiol, butandiol and as acids: azelaic, sebacic, undecandioic acid, dodecandioic acid, brassylic acid and their combinations.

To maximize compatibility among the mixtures of the invention and polylactic acid it is very useful the introduction of copolymers with blocks having high affinity for the aliphatic-aromatic copolyesters of the invention, and blocks with affinity for the lactic acid polymers or copolymers. Particularly preferred examples are block copolymers of aliphatic aromatic copolyesters with polylactic acid. Such block copolymers can be obtained taking the two original polymers terminated with hydroxyl groups and then reacting such polymers with chain extenders able to react with hydroxyl groups such as diisocyanates. Examples are 1,6 hexamethylene diisocyanate, isophorone diisocyanate, methylene diphenildiisocyanate, toluene diisocyanate or the like. It is also possible to use chain extenders able to react with carboxylic groups like di and poly epoxides (e.g. bisphenols diglycidyl ethers, glycerol diglycidyl ethers) divinyl derivatives if the polymers of the blend are terminated with acid groups. It is possible also to use as chain extenders carbodiimmides, bisoxazolines, isocyanurates etc.

The intrinsic viscosity of such block copolymers can be between 0.3 and 1.5 dl/g, more preferably between 0.45 and 1.2 dl/g. The amount of compatibilizer in the blend of aliphatic-aromatic copolyesters and polylactic acid can be in the range between 0.5 and 50%, more preferably between 1 and 30%, more preferably between 2 and 20% by weight.

The mixture according to the present invention can advantageously be blended also with nucleating agents and filler both of organic and inorganic nature.

Examples of nucleating agents include talc, saccharine sodium salt, calcium silicate, sodium benzoate, calcium titanate, boron nitride, zinc salts, porphyrin, chlorine, phlorin, porphodimethine, porphomethine, bacteriochlorin, isobacteriochorin, porphyrinogen, phorbin, isotactic polypropylene, PLA with low molecular weight and PBT.

The preferred amount of fillers is in the range of 0.5-70% by weight, preferably 5-50% by weight.

As regards organic fillers, wood powder, proteins, cellulose powder, grape residue, bran, maize husks, compost, other natural fibres, cereal grits with and without plasticizers such as polyols can be mentioned.

As regards inorganic fillers, it can be mentioned substances that are able to be dispersed and/or to be reduced in lamellas with submicronic dimensions, preferably less than 500 ntn, more preferably less than 300 nm, and even more preferably less than 50 nm. Particularly preferred are zeolites and silicates of various kind such as wollastonites, montmorillonites, hydrotalcites also functionalised with molecules able to interact with starch and or the specific polyester. The use of such fillers can improve stiffness, water and gas permeability, dimensional stability and maintain transparency.

The mixtures according to the present invention can be prepared by means of an extruder or any other machine capable of providing temperature and shear conditions that allows an homogeneous mixing of the components.

The mixtures according to the present invention are advantageously obtainable by reactive extrusion process with compounds carrying groups which can react with OH and/or COOH groups, such as for example, polyepoxides and polycarbodiimides or with unsaturated bonds such as for example peroxides.

In a preferred embodiment, the first polyester (A) and the second polyester (B) can be also present in the mixtures according to the present invention in the form of block copolymer.

Said block copolymer is advantageously obtainable by reacting the first polyester (A) with the second polyester (B) by means of the above compounds carrying groups which can react with OH and/or COOH groups or with unsaturated bonds.

Said block copolymer can be prepared in a separate step or can be prepared in situ during the reactive extrusion process.

Examples of peroxides that can advantageously be used are selected from the group of dialkyl peroxides, such as: benzoyl peroxide, lauroyl peroxide, isononanoyl peroxide, di-(t-butylperoxyisopropyl)benzene, t-butyl peroxide, dicumyl peroxide, alpha,alpha'-di(t-butylperoxy)diisopropylbenzene, 2,5-dimethyl-2,5 di(t-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxydicarbonate, dicetyl peroxydicarbonate, dimyristyl peroxydicarbonate, 3,6,9-triethyl-3,6,9-trimethyl-1,4,7-triperoxonan, di(2-ethylhexyl)peroxydicarbonate and mixtures thereof.

Preferably, said peroxides are added to the polyesters according to the invention in a quantity of less than 0.5%, more preferably of 0.2% and even more preferably of 0.1% by weight.

Examples of polyepoxides that can advantageously be used are all polyepoxides from epoxidized oils and/or from styrene-glycidyl ether-methylmetacrylate, such as products distributed by BASF Resins B.V. under the trademark Joncryl® ADR, glycidyl ether methylmetacrylate included in a range of molecular weights between 1000 and 10000 and with a number of epoxides per molecule ranging from 1 to 30 and preferably from 5 to 25, and epoxides selected from the group comprising: diethylene glycol diglycidyl ether, polyethylene glycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxide, 1,4-cyclohexanedimethanol diglycidyl ether, glycidyl 2-methylphenyl ether, glycerol propoxylate triglycidyl ether, 1,4-butanediol diglycidyl ether, sorbitol polyglycidyl ether, glycerol diglycidyl ether, tetraglycidyl ether of meta-xylenediamine and diglycidyl ether of bisphenol A, and mixtures thereof.

Preferably, said polyepoxides are added to the polyesters according to the invention in a quantity of less than 2%, more preferably of 1% and even more preferably of 0.75% by weight.

Catalysts can also be used to increase the reactivity of the reactive groups. In the case of polyepoxides, salts of fatty acids can, for example, be used. Calcium and zinc stearates are particularly preferred.

Examples of carbodiimides that can advantageously be used are selected from the group comprising: poly(cyclooctylene carbodiimide), poly(1,4-dimethylene cyclohexylene carbodiimide), poly(cyclohexylene carbodiimide, poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6', tetra-isopropyl-diphenylene carbodiimide), (Stabaxol® D), poly(2,4,6-triisopropyl-1,3-phenylene carbodiimide) (Stabaxol® P-100), poly(1,3,5-triisopropyl-phenylene-2,4-carbodiimide), poly(2,6 diisopropyl-1,3-phenylene carbodiimide) (Stabaxol® P), poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis(ethylcarbodiimide) and mixtures thereof.

Preferably, said carbodiimides are added to the polyesters according to the invention in a quantity of less than 1.5%, more preferably of 0.75% and even more preferably of 0.5% by weight.

In the present biodegradable mixtures various additives can also be incorporated, such as antioxidants, UV stabilizers, heat and hydrolysis stabilizers, chain extenders, flame retardants, slow release agents, inorganic and organic fillers, such as natural fibres, antistatic agents, wetting agents, colorants, lubricants or compatibilizing agents among the various phases.

The mixtures according to the invention are biodegradable in industrial composting in accordance with the standard EN 13432.

In the mixture according to the present invention the concentration of the at least first aliphatic-aromatic biodegradable polyester (A) varies, with respect to (A+B), in the interval between 5 and 95%, preferably between 20 and 70% in weight.

In a particularly preferred embodiment of the invention the concentration of the at least first aliphatic-aromatic biodegradable polyester (A) varies between 30 and 60% in weight with respect to total weight of the (A) and (B) polyesters. It has indeed surprisingly been found that in this range the mixture according to the present invention is home compostable according to the Italian Norm UNI 11355:2010.

Preferably, the mixtures according to the present invention show a puncture energy, measured on films having thickness of 10-50 μm, higher than 7 J/mm more preferably more than 9 J/mm and more preferably more than 12 J/mm Preferably, the mixtures according to the present invention show a Melting Temperature ($T_m$) higher than the $T_m$ of the aliphatic-aromatic biodegradable polyester (A).

With the regard to the Melting Temperature ($T_m$), it is advantageously determined by means of Differential Scanning calorimetry (DSC) with a differential scanning calorimeter Perkin Elmer Diamond operating with the following thermal profile:

30 seconds of thermal equilibration at −20° C.;
$1^{st}$ scan from −20 to 200° C. at 20° C./min;
30 seconds of thermal equilibration at 200° C.;
$2^{nd}$ scan from 200° C. to −20° C. at 10° C./min;
30 seconds of thermal equilibration at −20° C.;
$3^{rd}$ scan from −20 to 200° C. at 20° C./min
30 seconds of thermal equilibration at 200° C.;

$T_m$ is measured as the maximum of the endothermic peak during the $3^{rd}$ scan.

As regards to the measurement of puncture energy, it is performed according to the standard ASTM D5748-95 (2001), using a triangular pyramid shaped probe (edges=35 mm; vertex angles=90°) at a crosshead speed of 500 mm/min, temperature of 23° C., Relative Humidity of 55% on film specimens having a diameter of 125 mm.

As a reference, in the same testing conditions an HDPE film with thickness of 22 μm shows a puncture energy of 9.2 J/mm whereas an LDPE film with thickness of 40 μm shows a puncture energy of 10 J/mm.

The mixtures according to the invention have properties and viscosity values which make them suitable to be used, appropriately modulating the relative molecular weight, for numerous practical applications, such as films, injection molding articles, extrusion coatings, fibers, foams, thermoformed articles, with specific attention to applications where home compostability or biodegradation in non aggressive environments is desirable etc.

In particular, said mixtures and blends thereof are suitable for the production of:
- mono- and bi-oriented films, and films multilayered with other polymeric materials;
- films for use in the agricultural sector, such as films for use in mulching;
- cling films for use with foodstuffs, for bales in agriculture, and for wrapping waste;
- seed dressings;
- glues such as hot melt adhesives;
- bags and bin liners for the organic waste collection, such as the collection of food scraps and gardening waste;
- thermoformed foodstuff packaging, both mono- and multi-layered, as in containers for milk, yogurt, meats, beverages, etc;
- coatings obtained using the extrusion coating method;
- multilayer laminates with layers of paper, plastic, aluminum, or metalized films;
- expanded or expandable beads for the production of pieces obtained by sintering;
- expanded and semi-expanded products, including foam blocks formed using pre-expanded particles;
- foam sheets, thermoformed foam sheets, and containers obtained from them for use in foodstuff packaging;
- fruit and vegetable containers in general;
- composites with gelatinized, destructurized and/or complexed starch, natural starch, flours or vegetable or inorganic natural fillers;
- fibers, microfibers, composite microfibers wherein the core is constituted by rigid polymers such as PLA, PET, PTT and the shell is constituted by the material of the invention, blended composite fibers, fibers with different sections, from circular to multilobed, staple fibers, woven and nonwoven fabrics or spunbonded or thermobonded for use in sanitary and hygiene products, and in the agricultural and clothing sectors.

They can also be used in applications in place of plasticized PVC.

The invention is now illustrated by describing several embodiments, which shall be intended as nonlimiting examples of the inventive concept protected by the present patent.

EXAMPLE 1

40 parts by weight of a poly(butylenesebacate-co-butyleneterephthalate) with 47% mol % of butyleneterephthalate units and MFR at 2.16 kg, 190° C. of 6 g/10 min and $T_m$=116° C. were blended with 40 parts of a poly(butyleneadipate-co-butyleneterephthalate) with 53% mol % of butyleneterephthalate units MFR at 2.16 kg, 190° C. 2 g/10 min and $T_m$=132° C., 16 parts of starch, 2 parts of water, 2 parts of glycerol and 0.5 parts of a styrene-glycidyl ether-methylmetacrylate copolymer. The extruder used was a twin screw extruder Haake Rheocord 90 Rheomex TW-100. The thermal profile was ranging between 120 and 190° C.

The final water content of the granules was equal to 0.8%.

The granules showed a MFI of 3.5 g/10 min (determined according to ASTM at 160° C. and 5 kg according to the standard ASTM 1238-89) and $T_m$=132° C.

The granules were filmed on a 40 mm Ghioldi machine, die gap=1 mm, flow rate 20 kg/h to obtain film with a thickness of 20 μm.

The 20 μm films were then subjected to mechanical characterization according to the standard ASTM D882-88 (traction at 23° C. and 55% Relative humidity and Vo=50 mm/min) and according to the standard ASTM D5748-95 (2001) (triangular pyramid shaped probe with edges=35 mm and vertex angles=90°; crosshead speed of 500 mm/min, temperature of 23° C., Relative Humidity of 55% RH film specimen diameter of 125 mm)

The results are indicated in Table 1 below.

EXAMPLE 2

43 parts by weight of a poly(butylenesebacate-co-butyleneterephthalate) with 47% mol % of butyleneterephthalate units and MFR at 2.16 kg, 190° C. of 6 g/10 min and $T_m$=116° C. were blended with 30 parts of a poly(butyleneadipate-co-butyleneterephthalate) with 53% mol % of butyleneterephthalate units and MFR at 2.16 kg, 190° C. of 2 g/10 min and $T_m$=132° C., 7 parts of poly L-lactide polymer having a Mn of 130 000, MFR at 2.16 kg, 190° C. of 3.5 g/10 min, a residue of lactide less than 0.2% and a D content of about 6%, 16 parts of starch, 2 parts of water, 2 parts of glycerol and 0.5 parts of a styrene-glycidyl ether-methylmetacrylate copolymer. The extruder used was a twin screw extruder Haake Rheocord 90 Rheomex TW-100. The thermal profile was ranging between 120 and 190° C. The final water content of the granules was equal to 0.8%

The granules showed a MFI of 4.2 g/10 min (determined according to ASTM at 160° C. and 5 kg according to the standard ASTM 1238-89) and $T_m$=126° C.

The granules were filmed on a 40 mm Ghioldi machine, die gap=1 mm, flow rate 20 kg/h to obtain film with a thickness of 20 μm.

The 20 μm films were then subjected to mechanical characterization according to the standard ASTM D882-88 (traction at 23° C. and 55% Relative humidity and Vo=50 mm/min) and according to the standard ASTM D5748-95 (2001) (triangular pyramid shaped probe with edges=35 mm and vertex angles=90°; crosshead speed of 500 mm/min, temperature of 23° C., Relative Humidity of 55%, film specimen diameter of 125 mm)

The results are indicated in Table 1 below.

TABLE 1

| | MECHANICAL PROPERTIES | | | |
|---|---|---|---|---|
| Example | $\sigma_b$ (MPa) | $\epsilon_b$ (%) | E (MPa) | Puncture energy $En_b$ (J/mm) |
| 1 | 30 | 440 | 200 | 15 |
| 2 | 35 | 330 | 312 | 16 |

Determination of Starch Particles Dimension

The granules of the mixtures according to Examples 1 and 2 were immersed in liquid nitrogen and subsequently fractured so as to obtain a fracture surface along a cross-section of samples transverse section. A portion of said samples were then subjected to etching with HCl 5 N (25° C., 20 minutes), dried and a thin layer of a gold/palladium mixture was deposited thereupon by means of a "sputter coater".

Finally the so obtained fracture surfaces were examined under a scanning electron microscope (SEM) (magnification ×4000). For each sample, several microphotographies of the fracture surfaces were recorded. The mean dimension of the starch particles was calculated as the numeral (or arithmetic) average of the particles dimension.

The results are indicated in Table 2 below.

TABLE 2

STARCH PARTICLES DIMENSION

| Example | Average particle size dispersed starch (um) |
|---|---|
| 1 | 0.32 |
| 2 | 0.29 |

Biodegradation Test

Biodegradation tests as well as home compostability tests were performed respectively according to the EN 13432 standard and to Italian Norm UNI 11355:2010 on films samples obtained from the mixtures of Examples 1 and 2.

The results are shown in Table 3 below.

TABLE 3

BIODEGRADATION TESTS

| Example | Biodegradability according to EN 13432 Relative biodegradability after 150 days | Home compostability according to UNI 11355: 2010 Composition | % of disintegration | notes |
|---|---|---|---|---|
| 1 | >90% | according to UNI 11183 | >90 | disintegration time of 90 days |
| 2 | >90% | according to UNI 11183 | >90 | disintegration time of 110 days |

COMPARISON EXAMPLE 1

As a reference test, 80 parts by weight of a poly(butylene-adipate-co-butyleneterephthalate) with 53 mol % of butyleneterephthalate units and MFR at 2.16 kg, 190° C. of 2 g/10 min were blended with 16 parts of starch, 2 parts of water, 2 parts of glycerol and 0.5 parts of a styrene-glicidyl ether-methylmetacrylate copolymer. The extrusion conditions were the same of Example 1.

The final water content of the granules was equal to 0.8%

The granules were filmed on a 40 mm Ghioldi machine, die gap=1 mm, flow rate 20 kg/h to obtain film with a thickness of 20 μm.

The 20 μm film was then subjected to the biodegradation tests above reported. The film obtained was not home compostable according to the Italian Norm UNI 11355:2010 but even not biodegradable according to EN13432 norm for industrial composting.

What is claimed is:

1. A blend comprising:
   I) a mixture comprising:
      (A) at least a first aliphatic-aromatic biodegradable polyester (A) of the diacid-diol type obtained from a mixture comprising:
         a) at least one acid component having the following composition:
            a1) 51-95% by moles of aliphatic dicarboxylic acids, having at least 50% by moles of long chain diacids of renewable origin; and
            a2) 5-49% by moles of a polyfunctional aromatic acid; and
         b) at least one diol;
      (B) at least a second biodegradable aliphatic-aromatic polyester (B) obtained from a mixture comprising adipic acid, terephthalic acid, and at least one aliphatic diol; and
      (C) at least one polymer of natural origin (C);
      wherein the concentration of (A) varies, with respect to (A+B), in the interval between 5 and 95% by weight,
      wherein (C) is present in a quantity lower than 50% by weight with respect to (A+B+C), said mixture having a Melt Flow Index of 1.5-10 g/10 min;
   II) polylactic acid; and
   III) compatibilizers or toughening agents selected from the group consisting of polybutylene succinate and copolymers with adipic acid or lactic acid and/or hydroxyl caproic acid, polycaprolactone, aliphatic polymers of diols from C2 to C13 and diacids from C4 to C13, polyhydroxyalkanoates, polyvinylalcohol having a degree of hydrolysis in the range of between 75 and 99% and its copolymers, and polyvinylacetate having a degree of hydrolysis in the range of between 0 and 70%.

2. The blend according to claim 1, wherein said mixture comprises:
   (A) at least a first aliphatic-aromatic biodegradable polyester (A) of the diacid-diol type obtained from a mixture comprising:
      a) at least one acid component having the following composition:
         a1) 51-95% by moles of aliphatic dicarboxylic acids, having at least 60% by moles of long chain diacids of renewable origin; and
         a2) 5-49% by moles of a polyfunctional aromatic acid;
      b) at least one diol;
   (B) at least a second biodegradable aliphatic-aromatic polyester (B) obtained from a mixture comprising adipic acid, terephthalic acid and at least one aliphatic diol; and
   (C) at least one polymer of natural origin (C);
   wherein the concentration of (A) varies, with respect to (A+B) in the interval between 20 and 70% in weight,
   wherein (C) is present in a quantity lower than 45% in weight with respect to (A+B+C), said mixture having a Melt Flow Index of 2-7 g/10 min.

3. The blend according to claim 1, which is biodegradable in industrial composting in accordance with the standard EN 13432.

4. The blend according to claim 1, wherein the concentration of said at least first
   aliphatic-aromatic biodegradable polyester (A) varies, with respect to (A+B), in the interval between 30 and 60% by weight.

5. The blend according to claim 4, which is home compostable according to the Italian Norm UNI 1 1355:2010.

6. The blend according to claim 1, wherein said long chain diacid of said at least first aliphatic-aromatic biodegradable polyester (A) is selected from the group consisting of aliphatic dicarboxylic acids with number of C atoms in the main chain between 7 and 22 and mixtures thereof.

7. The blend according to claim 1, wherein said polyfunctional aromatic acid of said at least first aliphatic-aromatic biodegradable polyester (A) is selected from the group consisting of dicarboxylic aromatic compound of phthalic acid and dicarboxylic heterocyclic aromatic compound of renewable origin , mixtures thereof and esters thereof.

8. The blend according to claim 1, wherein said at least second biodegradable aliphatic-aromatic polyester (B) has a melting point between 50 and 170° C.

9. The blend according to claim 1, wherein the acid component of said at least second biodegradable aliphatic-aromatic polyester (B) comprises from 5-65% by moles of terephthalic acid or derivatives thereof.

10. The blend according to claim 1, wherein the diol component of said at least second biodegradable aliphatic-aromatic polyester (B) is selected from the group consisting of $C_2$-$C_6$ alkanediols and $C_5$-$C_{10}$ cycloalkanediols and mixtures thereof.

11. The blend according to claim 1, wherein said at least one polymer of natural origin is selected from the group consisting of starch, cellulose, chitin, chitosan, alginates, proteins, natural rubbers, rosin acid and its derivatives, lignins and their derivatives.

12. The blend according to claim 11, wherein said starch is in destructurized or gelatinized form or in filler form.

13. The blend according to claim 11, wherein said starch represents a homogeneously dispersed phase of particles with mean dimensions of less than 1 μm.

14. The blend according to claim 1, wherein said mixture I is blended with one or more additional polymers.

15. The blend comprising the mixture according to claim 14, wherein said one or more additional polymers are selected from the group consisting of biodegradable polyesters of diacid-diol, hydroxyacid or polyester-ether.

16. The blend according to claim 15, wherein said polyesters of diacid-diol type are aliphatic or aliphatic-aromatic.

17. The blend according to claim 16, wherein the content of said biodegradable polyesters from diacid-diol varies within the range between 1 and 99% by weight.

18. The blend according to claim 15, wherein said polyesters of hydroxyacid are selected from the group consisting of poly-L-lactic acid, poly-D-lactic acid and poly-D- L-lactic acid stereocomplex, poly-ε-caprolactone, polyhydroxybutyrate, polyhydroxybutyrate valerate, polyhydroxybutyrate propanoate, polyhydroxybutyrate hexanoate, polyhydroxybutyrate decanoate, polyhydroxybutyrate dodecanoate, polyhydroxybutyrate hexadecanoate , polyhydroxybutyrate octadecanoate and poly-3-hydroxybutyrate-4-hydroxybutyrate.

19. The blend according to claim 18, wherein the content of said biodegradable polyesters from hydroxy acid varies within the range between 1 and 99% by weight.

20. The blend comprising the mixture according to claim 14, wherein said one or more additional polymers are selected from the group consisting of polyolefins, non-biodegradable polyesters, polyester- urethanes, polyether-urethanes, polyurethanes, polyamides, polyamino acids, polyethers, polyureas, polycarbonates and mixtures thereof.

21. The blend according to claim 20, wherein the content of said polyolefins, non- biodegradable polyesters, polyester-urethanes, polyether-urethanes, polyurethanes, polyamides, polyamino acids, polyethers, polyureas, polycarbonates and mixtures thereof varies within the range from 0.5 to 99% by weight.

22. The blend comprising the mixture according to claim 14, wherein said one or more additional polymers are selected from rigid polymers with a modulus greater than 1,500 MPa.

23. The blend according to claim 22, wherein the content of said rigid polymers varies within the range from 5 to 30% by weight.

24. The blend according to claim 23, wherein said rigid polymers form a homogeneously dispersed phase of particles with mean dimensions of less than 2 μm.

25. The blend according to claim 24, wherein said rigid polymers are polymers or copolymers of polylactic acid containing at least 75% of L-lactic or D-lactic acid or combinations thereof.

26. The blend comprising the mixture according to claim 14, wherein said blend is obtained by a reactive extrusion process with compounds carrying groups which can react with OH and/or COOH groups, or with unsaturated bonds whereby the compounds are heated.

27. Films, injection molding articles, extrusion coatings, fibers, foams, or thermoformed articles comprising a mixture of:
(A) at least a first aliphatic-aromatic biodegradable polyester (A) of the diacid-diol type obtained from a mixture comprising:
a) at least one acid component having the following composition:
a1) 51-95% by moles of aliphatic dicarboxylic acids, having at least 50% by moles of long chain diacids of renewable origin; and
a2) 5-49% by moles of a polyfunctional aromatic acid; and
b) at least one diol;
(B) at least a second biodegradable aliphatic-aromatic polyester (B) obtained from a mixture comprising adipic acid, terephthalic acid, and at least one aliphatic diol;
(C) at least one polymer of natural origin (C);
wherein the concentration of (A) varies, with respect to (A+B), in the interval between 5 and 95% by weight,
wherein (C) is present in a quantity lower than 50% by weight with respect to (A+B+C),
said mixture having a Melt Flow Index of 1.5-10 g/10 min;
and one or more additional polymers;
or a blend of said mixture with polylactic acid;
and compatibilizers or toughening agents selected from the group consisting of polybutylene succinate and copolymers with adipic acid or lactic acid and/or hydroxyl caproic acid, polycaprolactone, aliphatic polymers of diols from C2 to C13 and diacids from C4 to C13, polyhydroxyalkanoates, polyvinylalcohol having a degree of hydrolysis in the range of between 75 and 99% and its copolymers, and polyvinylacetate having a degree of hydrolysis in the range of between 0 and 70%;
wherein said one or more additional polymers are selected from the group consisting of biodegradable polyesters of diacid-diol, hydroxyacid, or polyester-ether.

\* \* \* \* \*